United States Patent [19]

Hirose et al.

[11] Patent Number: 4,975,328

[45] Date of Patent: Dec. 4, 1990

[54] PROCESS FOR PRODUCING POLYURETHANE LENS

[75] Inventors: Yoshiro Hirose, Fussa; Takeshi Sakamoto, Akishima; Masahisa Kosaka, Itsukaichi; Mitsuo Sugimura, Hamura; Kazuo Inoue, Fussa; Eiichi Yajima, Fuchu; Kunio Sasaki, Akishima, all of Japan

[73] Assignee: Hoya Corporation, Tokyo, Japan

[21] Appl. No.: 243,993

[22] Filed: Sep. 13, 1988

[30] Foreign Application Priority Data

Sep. 22, 1987 [JP] Japan .................................. 62-238151
Jan. 29, 1988 [JP] Japan .................................. 63-18756
Jan. 29, 1988 [JP] Japan .................................. 63-18757

[51] Int. Cl.$^5$ .......................... B32B 27/38; B05D 5/06
[52] U.S. Cl. .................................... 428/413; 427/163; 264/1.1; 264/1.7; 264/26; 523/106
[58] Field of Search .................. 427/163; 264/1.1, 1.7, 264/2.6; 428/413, 425.5, 423.1, 689, 447, 451; 523/106

[56] References Cited

U.S. PATENT DOCUMENTS 4,603,158 7/1986 Markham et al. ................. 524/100

Primary Examiner—Stanley Silverman
Attorney, Agent, or Firm—Nixon & Vanderhye

[57] ABSTRACT

A polyurethane lens is produced by (a) adding to a monomer mixture comprising a polyisocyanate and a polythiol, a phosphoric acid ester represented by the general formula (I)

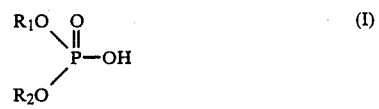

($R_1$ and $R_2$ which may be the same or different are each an alkyl group of 1–8 carbon atoms) and then (b) subjecting the monomer mixture containing the phosphoric acid ester, obtained in the step (a) to cast polymerization in a mold for plastic lens production. Said polyurethane lens has good releasability from mold, is free from color unevenness after tinting and cloudiness, and possesses high refractive index ($N_D$) and high optical dispersion.

6 Claims, No Drawings

PROCESS FOR PRODUCING POLYURETHANE LENS

BACKGROUND OF THE INVENTION

1. Field of the Invention

The present invention relates to a process for producing a polyurethane lens The polyurethane lens produced according to the process of the present invention is used as various optical lenses such as spectacle lens, camera lens and the like.

2. Description of Prior Art

In recent years, demand for plastic lenses as spectacle lens has increased both in Japan and other countries. These plastic lenses are generally made of a polymer obtained by subjecting diethyelne glycol bisallylcarbonate (hereinafter referred to as DAC) to cast polymerization, or in some cases of a polymethyl methacrylate, a polystyrene, a polycarbonate or the like subjected to injection molding.

DAC resin made lenses have merits of being lighter, less breakable and more easily tinted than glass-made lenses and can meet a recent fashionable need of combining a large-sized frame and a color lens.

However, the DAC resin has a refractive index (hereinafter referred to as $N_D$) of 1.500 which is smaller than the $N_D$ of glass (1.523, making large the thickness of the DAC resin-made lens. Accordingly, the DAC resin lenses are not much liked by users requiring a high diopter lens.

A number of proposals have been made in order to improve the above-mentioned problems of the DAC resin lenses. For example, Japanese patent application Kokai (Laid-Open) No. 217301/1985 proposes a copolymer of a polyisocyanate, a polyol and an aromatic vinyl compound, This copolymer has a high $N_D$ of at least 1.60, making it possible to produce a lens of small thickness. However, the copolymer has an optical dispersion (hereinafter referred to as $\nu_D$ of about 30 and gives striking color dispersion Therefore, it has very limited applications as a spectacle lens. Further, in the production of the above copolymer, it is difficult to control the reaction between the polyisocyanate and the polyol; therefore, it is necessary to reduce the content of the polyisocyanate component and the polyol component in the monomer mixture. This inevitably leads to the production of only a copolymer low in number of urethane bond, and the polymer will not have good impact resistance inherently possessed by urethane bond.

Japanese patent application Kokai (Laid-Open) No. 164501/1984 proposes a copolymer of halogen-containing aromatic vinyl compounds. While this copolymer has a very high $N_D$ of 1.60–1.64 and is effective in producing a lens of small thickness, the copolymer has a $\nu_D$ as low as about 30 and has limited applications as a spectacle lens. In addition, the copolymer is said to have poor impact resistance and low tintability.

Japanese patent application Kokai (Laid-Open) No. 217229/1985 and Japanese patent application Kokai (Laid-Open) No. 199016/1985 propose a copolymer of a polyisocyanate and a sulfur atom-containing polyol and a copolymer of a polyisocyanate and a polythiol, respectively. Since these polyurethanes have a high $N_D$ of 1.56–1.64 and a small specific gravity of 1.22–1.44, they are suitable as materials for thin and light spectacle lenses, in particular. Further, these polyurethane lenses inherently have excellent impact resistance and tintability. When the above polyurethane lenses are produced according to cast polymerization, the glass-made or metallic mold used is coated with a silicon- or fluorine-based releasing agent in order to endow the produced lens with good releasability. This causes the remaining of the releasing agent on the surface of the lens released from the mold, which invites the color unevenness of the tinted lens and the peeling of the coating film formed on the lens. Moreover, the use of the releasing agent requires a long-time washing treatment for used mold.

In order to solve the above problems of the process comprising coating a mold with a releasing agent, it was proposed to add a releasing agent to a monomer mixture instead of coating a releasing agent on a mold and then subject the whole mixture to cast polymerization. In this case of adding a silicon- or fluorine-based releasing agent to a monomer mixture comprising a polyisocyanate and a polythiol, however, the amount of the releasing agent being in contact with the inner surface of the mold is very small as compared with a case of coating the releasing agent on the mold and, as a result, it is difficult to release the produced polyurethane lens from the mold smoothly The releasability of the lens from the mold can be improved by increasing the amount of the releasing agent added to the monomer mixture, but the use of the releasing agent in a large amount causes the cloudiness of the lens produced or the separation of the polymer from the mold during polymerization, thus making it impossible to obtain a lens of high commercial value.

Therefore, it had been desired to develop a polyuretahne lens having excellent releasability form a mold after cast polymerization and causing no color uneVenness during tinting and no peeling of the coating film formed thereon.

The polyurethane lenses of high refractive index produced according to the above prior art, similarly to conventional other plasitc lenses, have a big demerit of poor mar resistance. In order to improve the mar resistance, it was studied to form a cured film on these polyurethane lenses. For example, Japanese Pat. Publication Nos. 18624/1981 and 39291/1985 disclose a coatig composition composed mainly of a hydrolyzate of an organic silicon compound and colloidal silica. When the coating composition disclosed therein is applied onto a polyurethane lens, followed by the curing of the composition to form a cured film, there is obtained a polyurethane lens which is greatly improved in mar resistance and sufficiently usable. However, since this cured film has a refractive index smaller than that of the polyurethane lens base and incurs interference fringes, the cured film is not desirable viewed from the practical application.

Japanese Pat. Publication No. 48123/1986 discloses a process for producing a highly refractive lens with anti-reflection by forming on the surface of a lens made of a synthetic resin of relatively high refractive index (e.g. polymer of diallyl phthalate, diallyl isophthalate or diallyl chlorendate) a cured film of a melamine resin having a refractive index close to that of the lens base and then forming thereon an anti-reflection film made of inorganic substances. In general, when a cured film is formed from a resin of addition polymerization type such as a melamine resin, the curing temperature must be fairly high. Therefore, the cured film can have a fairly high hardness when it is formed on a substrate of good heat resistance (e.g. metallic Or glass-made substrate), but when the film is formed on a substrate of poor heat resistance e.g. plastic substrate), there is required a long curing time. In the latter case, because the curing temperature is low, the hardness of the cured film is not so high as that of the cured film formed on a metal or a glass. These problems exist also when a coating composition comprising a melamine resin is coated and cured on a polyurethane lens.

Japanese patent application Kokai (Laid-Open) No. 99236/1981 discloses a method for forming a cured film from a coating composition consisting of (a) a colloidal dispersion of at least one member selected from a metal, an alloy and a metal salt, (b) a partial condensate of an organic silicon compound represented by the general formula $RSi(OH)_3$ and (c) a catalyst for curing the partial condensate (b). The cured film obtained according to this method, having a relatively high refractive index, satisfies one of the requirements for the cured film of highly refractive plastic lens. However, since the coating composition as a starting material of the cured film compirses as the curing catalyst sodium acetate, choline acetate, etc., the practice of the above method involves such problems as the insufficient stability of the coating composition and the insufficient transparency of the cured film formed from the composition.

Japanese Pat. Publication No. 54331/1986 discloses the formation of a cured film from a coating composition consting of (a) a sol of colloidally dispersed antimony pentoxide, (b) an orgnaic silicon compound having an epoxy group and (c) at least one curing agent for the epoxy group, selected from various metal complexes and metal alkoxides. This cured film, also having a relatively high refractive index, satisfies one of the requirements for the cured film of highly refractive plastic lenses. However, when the coating composition comprises the antimony pentoxide sol in an increased amout in order to obtain a cured film of higher refractive index, the cured film tends to have cloudiness and cracks and the resulting lens is not desirable for use as a spectacle lens. This prior art uses, as the curing agent for the epoxy group, an aluminum compound such as aluminum acetylacetonate or the like. When a coating composition comprising such a curing agent for the epoxy group is coated on a polyurethane lens base and cured, the resulting cured film has insufficient adhesion to the base.

Hence, it had been desired to develop a polyurethane lens having such a cured film that has a sufficient hardness to improve the inherently low mar resistance of polyurethane lens, has excellent tranSparency and excellent adhesion to polyurethane lens base and, owing to the small difference in refractive index between the cured film and the polyurethane lens base, causes no interference fringes.

SUMMARY OF THE INVENTION

Therefore, the first object of the present invention is to provide a novel process for producing a polyurethane lens having excellent releasability from a mold after cast polymerization and causing no color unevenness during tinting and no peeling of the coating film formed thereon.

The second object of the present invention is to provide a process for producing a polyurethane lens having such a cured film that has sufficient hardness to improve the inherently low mar resistance of polyurethane lens, has excellent transparency and excellent adhesion to polyurethane lens base and owing to the small difference in refractive index between the cured film and the polyurethane lens base, causes no interference fringes.

Other objects will be apparent from the following description.

The present inventors made extensive study in order to achieve the above first object of the present invention and, as a result, found that the polyurethane lens produced by cast polymerization in mold such as a glass-made or metallic mold can be easily released from the mold by adding to a monomer mixture to be cast-polymerized a phosphoric acid ester as a releasing agent which is represented by the following general formula (I):

wherein $R_1$ and $R_2$ which may be the same or different are each an alkyl group of 1–8 carbon atoms. The present inventors also found that unlike the conventional process comprising coating a known silicon- or fluorine-based releasig agent on a mold or adding the releasing agent to a monomer mixture to be polymerized, the above process for polyurethane lens production using a particular phosphoric acid ester as a releasing agent causes no cloudiness of produced lens, no separation of polymer (lens) from mold during polymerization, no color unevenness of lens during tinting and no peeling of coating film formed on lens.

Hence, the present invention resides in a process for producing a polyurethane lens, which comprises:

(a) a step of adding to a monomer mixture comprising a polyisocyanate and a polythiol, a phosphoric acid ester represented by the general formula (I)

($R_1$ and $R_2$ which may be the same or different are each an alkyl group of 1–8 carbon atoms), and (b) a step of subjecting the monomer mixture containing the phosphoric acid.ester, obtained in the step (a) to cast polymerization in a mold for plastic lens production to obtain a desired polyurethane lens.

The present inventors made further study in order to achieve the above second object of the present invention and, as a result, found that when a coating composition comprising the following components (A), (B), (C and (D) is coated on the surface of the polyurethane lens produced by the above steps (a) and (b) and thereafter cured, the resulting cured film has a sufficient hardness to improve the inherently low mar resistance of polyurethane lens, has excellent transparency and excellent adhesion to the polyurehtane lens and, owing to the small difference in refractive index between the cured film and the polyurethane lens base, causes no interference fringes.

(A) An organosilicon compound represented by the general formula $R^1Si(OR^2)_3$ ($R^1$ is an epoxy group-containing orgnaic group of 4–14 carbon atoms and $R^2$ is a $C_{1-4}$ alkyl or $C_{1-4}$ alkyl carbonyl group), or a hydrolyzate thereof.

(B) A sol of antimony pentoxide having particle diameters of 5–50 nm colloidally dispersed in an organic solvent.

(C) At least one epoxy compound represented by the following general formula.

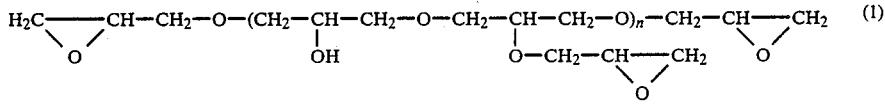 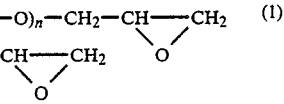

(n is 2 or 3.)

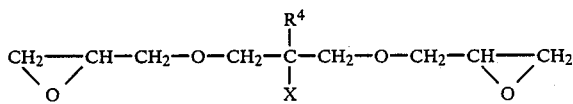

[X is $-CH_2OR^3$ or $-OR^3$ ($R^3$ is H or $-CH_2-CH-CH_2$ with epoxide), and $R^4$ is H, $-CH_3$ or $-CH_2-CH_3$.]

(D) At least one member selected from the group consisting of dibutyltin dilaurate, dibutyltin maleate and titanium isopropoxyoctylene glycolate.

Therefore the process for polyurethane lens production according to the present invention can further include:

(c) a step of coating on the surface of the polyurethane lens produced in the second step (b), a coating composition comprising the above components (A), (B), (C) and (D) and curing the composition to form a cured film.

DETAILED DESCRIPTION OF THE INVENTION

The present invention is described in detail below.

The phosphoric acid ester added to the monomer mixture as a releasing agent in the step (a) of the present process for polyurethane lens production is represented by the following general formula (I):

wherein $R_1$ and $R_2$ which may be the same or different are each an alkyl group of 1–8 carbon atoms.

The reason for restricting $R_1$ and $R2$ to an alkyl group of 1–8 carbon atoms in the phosphoric acid ester of the general formula (I) is that the use of a phosphoric acid ester having carbon atoms more than 8 makes the resulting polyurethane lens cloudy.

In the phosphoric acid ester of the general formula (I), $R_1$ and $R_2$ may be the same or different. In view of the commercial availability of the ester, it is preferable that $R_1$ and $R_2$ be the same alkyl group.

As such a phosphoric acid ester, there can he mentioned dimethyl phosphate, diethyl phosphate, dipropyl phosphate, dibutyl phosphate, dipentyl phosphate, dihexyl phosphate, diheptyl phosphate and dioctyl phosphate.

The phosphoric acid ester of the general formula (I) has one hydroxyl group in the molecule. The reasons for restricting the ester to a phosphoric acid ester having one hydroxyl group are that a phosphoric acid ester having two or more hydroxyl groups in the molecule easily reacts with the polyisocyanate (a component of the monomer mixture) and produces opaque substances during the preparation of the monomer mixture or causes foaming during the polymerization of the monomer mixture and that a phosphoric acid ester having no hydroxyl group in the molecule allows the resulting polyurethane lens to fusion-bond to the mold, making it impossible to release the lens from the mold.

When there is used a phosphorous acid ester represented by the following general formula

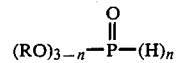

(R is an alkyl group and n is an integer of 0–3), it is difficult to release the resulting polyurethane lens from the mold, irrespective of the addition amount and molecular structure of the phosphorous acid ester.

The addition amount of the phosphoric acid ester of the general formula I) is preferably 0.01–20% by weight, especially preferably 0.02–5% by weight based on the total of the polyisocyanate and the polythiol. When the addition amount is less than 0.01% by weight, it is difficult to release the produced lens from the glass-made or metallic mold. When the addition amount is more than 20% by weight, there occur in some cases the foaming or gelation during the preparation of the monomer mixture and the cloudiness of the lens produced.

However, the above addition amount range of the phosphoric acid ester, i.e. 0.01–20% by weight is not critical because by considering other polymerization conditions it is possible to effect polymerization with no problem and to release the produced lens from the mold smoothly even when the addition amount of the phosphoric acid ester is less than 0.01% by weight or more than 20% by weight.

The polyisocyanate used in the present invention as one monomer for the production of polyurethane lens has no particular restriction. Specific examples of the polyisocyanate include polyisocyanate compounds such as tolylene diisocyanate, diphenylmethane diisocyanate, polymeric type diphenylmethane diisocyanate, naphthylene diisocyanate, tolylene diisocyanate, hexamethylene diisocyanate, isophorone diisocyanate, xylene diisocyanate, hydrogenated xylene diisocyanate, hydrogenated diphenylmethane diisocyanate, lysine diisocyanate, triphenylmethane triisocyanate, tris-(isocyanatophenyl) thiophosphate, trans-cyclohexane 1,4-diisocyanate, p-phenylene diisocyanate, tetramethylene diisocyanate, 1,6,11-undecane triisocyanate, 1,8- diisocyanato-4-isocyanatomethyloctane, lysine ester triisocyanate. 1.3.6-hexamethylene triisocyanate, bicycloheptane triisocyanate and the like; their modification products with allophanate, biuret or isocyanurate; and the adducts of the above polyisocyanates with a polyol or a polythiol. These compounds can be used alone or, as necessary, in admixture of two or more. Other known isocyanate compounds can also be used. The isocyanate compound used or the main isocyanate component when two or more isocyanate compounds are used must be at least bifunctional. The isocyanate compound may be an aromatic isocyanate compound containing halogen atoms such as Cl or Br. Particularly preferable isocyanate compounds include non-yellowing isocyanate compounds represented by xylene diisocyanate, isophorone diisocyanate and hexamethylene diisocyanate.

The polythiol used in the present invention as the other monomer for the reaction with the polyisocyanate for the production of polyurethane lens has no particular restriction, either, and can be a known polythiol. There can be mentioned for example, ethanedithiol, propanedithiol, propanetrithiol, butanedithiopl, pentanedithiol, hexanedithiol, heptanedithiol, octanedithiol, cyclohexanedithiol, cycloheptanedithiol, 2,5-dichlorobenzene-1,3-dithiol, pentaerythritol tetrakis(3-mercaptopropionate) and pentaerythritol tetrakisthioglycolate. Of these, pentaerythritol derivatives are preferred particularly.

As the polythiol used in the present invention, there can also be mentioned a polythiol having a triazine ring represented by the following general formula (II)

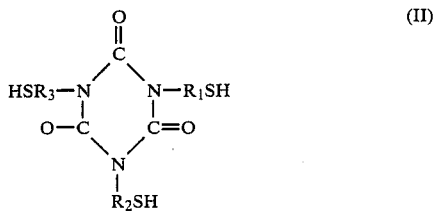

(II)

wherein $R_1$, $R_2$ and $R_3$ which may be the same or different are each an alkyl group of 1-8 carbon atoms. Such a polythiol having a triazine ring includes tris(2-mercaptoethyl) isocyanurate, tris(3-mercapto-n-propyl) isocyanurate, tris(2-methyl-3-mercapto-n-propyl) isocyanurate, tris(mercaptomethyl) isocyanurate, an ester of tris(2-hydroxyethyl)isocyanuric acid with mercaptopropionic acid, an ester of tris(2-hydroxyethyl)isocyanuric acid with mercaptoacetic acid, an ester of tris(hydroxymethyl)isocyanuric acid with mercaptopropionic acid and an ester of tris(hydroxymethyl)isocyanuric acid with mercaptoacetic acid.

The mixing ratio of the polyisocyanate to the polythiol is in the range of preferablY 0.5-1.5, especially preferably 0.8-1.2 in terms of NCO/SH molar ratio. When the NCO/SH molar ratio is outside the range of 0.5-1.5, the resulting polyurethane has a very low polymerization degree and accordingly is inferior in such important properties as heat resistance, impact resistance, surface hardness and surface smoothness.

In the present process, a polymerization catalyst is added to the monomer mixture comprising the polyisocyanate and the polythiol to catalyze the polymerization of these monomers in the step (b to be described later. As such a polymerization catalyst, there are preferably used organic tin compounds such as dibutyltin dilaurate, dibutyltin maleate and the like. Amine type catalysts are not suitable as an catalyst for use in lens molding because they tend to cause foaming. The addition amount of the polymerization catalyst the organic tin compound) is preferably 0.01-0.8% by weight, especially preferably 0.02-0.2% by weight based on the total of the polyisocyanate and the polythiol. It is preferable that the specific addition amount of the catalyst be determined within the above range depending upon the reactivities of the monomers used and the activity of the catalyst used. When the addition amount of the organic tin compound type catalyst is less than 0.01% by weight, the resulting polyurethane has a very low polymerization degree and is poor in such important properties as heat resistance, impact resistance surface hardness and surface smoothness. When the addition amount is more than 0.8% by weight, foaming tends to occur and the raw material mixture has a very short pot life.

The monomer mixture comprising the polyisocyanate and the polythiol can further comprise, as necessary, various known additives such as light stabilizer, ultraviolet absorber, antioxidant, antistatic agent and defoamant. The monomer mixture can furthermore comprise a radical-polymerizable comonomer in order to obtain a polyurethane of improved properties. Optionally the monomer mixture can comprise a small amount of a hydroxyl group-containing monomer. In that case, the molar ratio of NCO/(SH+OH) must be in a range of 0.5 to 1.5.

The monomer mixture comprising the phosphoric acid ester of the general formula (I), obtained in the step (a) is subjected, in the subsequent step b), to cast polymerization in a mold for plastic lens production to obtain a desired polyurethane lens.

The mold used for the cast polymerization is preferably constituted by, for example, a glass- or plastic-made cope, a glass- or plastic-made drag and a plastic-made gasket. The monomer mixture is poured into this mold and then polymerized therein with heating.

With respect to the polmerization temperature, it is preferable that the initial polymerization temperature be 5-40° C. and the polymerization system be gradually heated to 100-130° C. in 10-70 hours. When the initial temperature is lower than 5° C., too long a polymerization time is required. When the initial temperature is higher than 40° C., the resulting lens tends to be optically non-uniform. When the final temperature is lower than 100° C., certain proportions of the monomers fed tend to remain unreacted and the polymer formed has a low polymerization degree and insufficient properties. When the final temperature is higher than 130° C., the produced lens yellows.

To the polyurethane lens obtained in the step (b) can be applied various treatments such as tinting, polishing, acrylic or silicon type hard coating and anti-reflection coating by organic substance according to known methods. Further, anti-fogging treatment, treatment for water and oil repellency, etc. may be applied.

Next, the step (c) which is effected after the step (b) as necesary, is described.

As described previously, the step (c) is to coat on the surface of the polyurethane lens obtained in the step (b), a coating composition comprising the components (A), (B), (C) and (D) and then to cure the composition to form a cured film.

The component (A) is an organic silicon compound represented by the general formula $R^1Si(OR^2)_3$ ($R^1$ is an epoxy group-containing organic group of 4–14 carbon atoms and $R^2$ is a $C_{1-4}$ alkyl or $C_{1-4}$ alkyl carbonyl group), or a hydrolyzate thereof. Preferable examples of the component (A) include γ-glycidoxypropyltrimethoxysilane, γ-glycidoxypropyltriethoxysilane, γ-glycidoxypropyldimethoxyethoxysilane, γ-glycidoxypropyltriacetoxysilane, β-(3,4-epoxycyclohexyl)ethyltriethoxysilane and their hydrolyzates.

The antimony pentoxide sol used as the component (B) is a colloidal solution wherein the fine Particles of antimony pentoxide having particle diameters of 5–50 nm are dispersed in an organic solvent, and it can be produced according to a known method.

There are two types of antimony pentoxide sols, i.e. an antimony pentoxide sol of aqueous dispersion tYpe and an antimony pentoxide sol of organic solvent dipsersion type. If an antimony pentoxide sol of aqueous dispersion type is used, the resulting coating composition has low stability and the cured film formed therefrom has insufficient transparency. Further, if the above coating composition is diluted with an organic solvent prior to the application (this dilution with an organic solvent is oft:n done in the ordinary application of a coating composition to a plastic lens , the stability of the composition is reduced because the antimony pentoxide sol contained in the composition is of aqueous dispersion type. Hence, the antimony pentoxide sol used in the present invention is restricted to an organic solvent dispersion type. The organic solvent as a dispersing medium includes, for example, alcohols such as methanol, ethanol, isopropanol and the like, as well as cellosolves such as methyl cellosolve, ethyl cellosolve, butyl cellosolve and the like.

The antimony pentoxide preferably has particle diameters of 5–50 nm. When the particle diameters are smaller than 5 nm, the resulting coating composition has low stability. When the particle diameters are larger than 50 nm, the resulting cured film has insufficient transparency.

The antimony pentoxide sol is used preferably in such an amount that the ratio of the antimony pentoxide (as solid)/the organic silicon compound or its hydrolyzate becomes ½ to 4/1 When the ratio is smaller than ½, the resulting cured film has a low refractive index and there appear interference fringes at an unacceptable level. When the ratio is larger than 4/1, the resulting cured film has insufficient adhesion to the polyurethane lens and also to the inorganic anti-reflection film as necessary formed on the cured film as described later.

The epoxy compound used as the component (C) is represented by the following general formula.

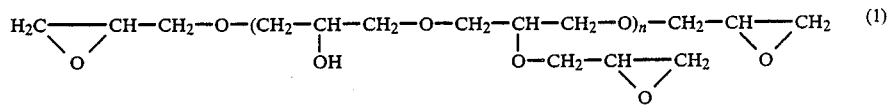

(n is 2 or 3.)

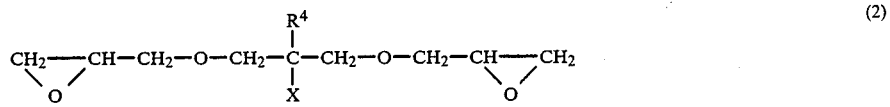

[X is $-CH_2OR^3$ or $-OR^3$ ($R^3$ is H or $-CH_2-CH-CH_2$), and
$\phantom{xxxxxxxxxxxxxxxxxxxxxxxxxxxxxxxxxxxxx}\backslash_O\!/$
$R^4$ is H, $-CH_3$ or $-CH_2-CH_3$.]

This epoxy compound is used in order to increase the compatibility between the organic silicon compound or its hydrolyzate and the antimony pentoxide sol and also to increase the adhesion of the cured film to the polyurethane lens and the anti-reflection film as necessary formed on the cured film. the amount of the epoxy compound used differs by the type of the component (D) to be described later in detail. That is, when the component (D) is selected from dibutyltin dilaurate and dibutyltin maleate, the epoxy compound is used preferably in an amount of 10–80 parts by weight based on 100 parts by weight of the total of the organic silicon compound or its hydrolyzate and the antimony pentoxide sol. When the amount of the epoxy compound is less than 10 parts by weight, the resulting cured film has insufficient transparency. When the amount is more than 80 parts by weight, the cured film has a low refractive index resulting in the appearance of interference fringes and also has lower mar resistance.

When the component (D) is titanium isopropoxyoctylene glycolate, the epoxy compound is used preferably in an amount of 5–100 parts by weight based on 100 parts by weight of the total of the organic silicon compound or its hydrolyzate and the antimony pentoxide sol. When the amount of the epoxy compound used is less than 5 parts by weight, the resulting cured film has insufficient transparency. When the amount is more than 100 parts by weight, the cured film has a lower refractive index resulting in the appearance of interference fringes and also has a lower hardness.

The component (D) is at least one member selected from dibutyltin dilaurate, dibutyltin maleate and titanium isopropoxyoctylene glycolate. The organic tin compounds as the component (D) are used to allow the resulting coating composition to have good stability and the cured film formed therefrom to be substantially colorless and have strong adhesion to the polyurethane lens and the inorganic anti-reflection film as necessary formed on the cured film.

The amount of the organic tin compounds used is preferably 0.01–5 parts by weight based on 100 parts by weight of the total of the organic silicon compound or its hydrolyzate (A), the antimony pentoxide sol (B) and the epoxy compound (C). When the amount is less than 0.01 part by weight, the resulting film has insufficient curability. When the amount is more than 5 parts by weight, the cured film has insufficient transparency.

Organic tin chlorides (e.g. tributyltin chloride, dimethyltin dichloride and organic tin hydroxides (e.g.

trimethyltin hydroixde, dimethylphenyltin hydroxide) are known as a curing catalyst for epoxy group-containing organic silicon compounds. When these organic tin compounds are used in the coating composition of the step (c) as a curing catalyst for the composition, the resulting coating composition has insufficient stability and curability and, when cured, has insufficient adhesion to the polyurethane lens.

The titanium isopropoxyoctylene glycolate as the component (D) is used to allow the resulting cured film to have strong adhesion to the polyurethane lens and the anti-reflection film.

The amount of the titanium isopropoxyoctylene glycolate used is preferably 5–60 parts by weight based on 100 parts by weight of the total of the organic silicon compound or its hydrolyzate (A) and the antimony pentoxide sol (B). When the amount is less than 5 parts by weight, the resulting cured film has insufficient adhesion to the anti-reflection film. When the amount is more than 60 parts by weight, the cured film has insufficient transparency.

The coating composition can further comprise, in addition to the components (A), (B), (C) and (D), various surfactants in order to improve its flowability during the application and to allow the resulting cured film to have high surface smoothness. The coating composition can furthermore comprise an ultraviolet absorber, an antioxidant, etc. unless their addition adversely affects the physical properties of the cured film formed from the coating composition.

The coating composition can be prepared according to any desired method. For example, the components (A), (B), (C) and (D) can be mixed at one time, or can be placed in a container stepwise in any desired order and then mixed. In the latter case, it is preferred that the components (A), (B), (C) and (D) he placed in a container in this order.

In coating the resulting coating composition on the surface of a polyurethane lens, the composition can be diluted with an appropriate solvent depending upon the coating method employed. The coating method includes methods ordinarily employed such as dipping method, spinning method and spraying method. The dipping method and the spin coating method are especially preferred in view of the surface smoothness of the cured film formed with the coating composition.

The coating composition is coated on the surface of a polyurehtane lens and then heated, for example, at 90–120° C. for 0.5–3 hours to form a desired cured film.

The process for production of a polyurethane lens according to the present invention can furthermore include:

(d) a step of forming an anti-reflection film made of inorganic substances on the cured film obtained in the step (c).

The anti-reflection film includes a film obtained by laminating a high refractive index layer and a low refractive index layer alternately. The high refractive index layer can most preferably be made of zirconium oxide. It can also be made of aluminum oxide, titanium oxide, cerium oxide, indium oxide, neodymium oxide or tantalum oxide. The low refractive index layer can most preferably be made of silicon oxide. It can also be made of magnesium fluoride. The lamination order of the layers can be an order of a high refractive index layer, a low refractive index layer, a high refractive index layer, a low refractive index layer, or an order of a low refractive index layer, a high refractive index layer, a low refractive index layer. The number of the layers laminated can be 3–20 in order to obtain a desired effect.

The anti-reflection film can be formed according to a method such as vacuum deposition or the like.

EXAMPLES

First, Examples 1–15 with respect to the present process for polyurethane lens production consisting of the step (a) and (b) are described and compared with Comparative Examples 1–8.

EXAMPLE 1 m-Xylene diisocyanate (mXDI) 100 g
Pentaerythritol tetrakis(3-mercaptopropionate) (PETMP) 142 g
Di-n-butyl phosphate (DBP) 6.05 g*
[* 2.5% by weight based on the total of (mXDI+-PETMP)]
Dibutyltin dilaurate 0.24 g
2(2'-hydroxy-5'-t-octylphenyl)benzotriazole 0.48 g The mixture of the above materials was stirred at room temperature for 30 minutes and then degased at 1 mmHg for 60 minutes. It was placed in a mold consisting of a glass-made cope, a glass-made drag and a polyethylene-based gasket and polymerized at 25° C. for 5 hours, at 40° C. for 5 hours, at 60° C. for 7 hours, at 80° C. for 3 hours and at 120° C. for 2 hours. The resulting polyurethane lens was taken out of the mold. The lens had an $N_D$ of 1.592, a $\nu_D$ of 36 and a specific gravity of 1.35. The releasability of the lens from the mold was good, and neither the lens nor the mold was damaged. The lens had a center thickness of 1.6 mm and excellent transparency and was free from color unevenness after tinting. (Table 1 should be referred to in detail.)

EXAMPLE 2

The procedure of Example 1 was repeated except that the addition amount of DBP was changed to 2.8 g [1.2% by weight based on the total of (mXDI+-PETMP)], to obtain a polyurethane lens which was excellent similarly to the lens of Example 1, as shown in Table 1.

EXAMPLE 3

The procedure of Example 1 was repeated except that 115 g of isophorone diisocyanate (IPDI) was used in place of 100 g of mXDI and the addition amount of DBP was changed to Z.8 [1% by weight based on the total of (IPDI+PETMP)], to obtain a polyurethane lens which was excellent similarly to the lens of Example 1, as shown in Table 1.

EXAMPLE 4

The procedure of Example 1 was repeated except that 95 g of mXDI and 5 g of tolylene diisocyanate (TDI) were used in place of 100 g of mXDI, the addition amount of PETMP was changed to 132 g and the addition amount of DBP was changed to 1.4 g [0.6% by weight based on the total of (mXDI+TDI+PETMP)], to obtain a polyurethane lens which was excellent similarly to the lens of Example 1, as shown in Table 1.

EXAMPLE 5 m-Xylene diisocyanate (mXDI) 100 g
Tris(3-mercapto-n-propyl) isocyanurate (TMPIC) 124 g
Di-n-butyl phosphate (DBP) 5.6 g*

[2.5% by weight based on the total of (mXDI+TMPIC)]
Dibutyltin dilaurate 0.2 g
2(2'-hydroxy-5'-t-octylphenyl)benzotriazole 0.5 g The mixture of the above materials was stirred at room temperature for 30 minutes and then degassed at 1 mmHg for 60 minutes. It was placed in a mold consisting of a glass-made cope, a glass-made drag and a polyethylene-based gasket and polymerized at 25° C. for 5 hours, at 40° C. for 5 hours, at 60° C. for 7 hours, at 80° C. for 3 hours and at 120° C. for 2 hours. The resulting polyurethane lens was taken out of the mold.

The lens had an $N_D$ of 1.61, a $\nu_D$ of 35 and a specific gravity of 1.35. The releasability of the lens from the mold was good, and neither the lens nor the mold was damaged. The lens had a center thickness of 1.8 mm, and was transparent and free from color unevenness after tinting. (Table 1 should be referred to in detail.)

EXAMPLE 6

The procedure of Example 5 was repeated except that 100 g of tolYlene diisocyanate (TDI) was used in place of 100 g of mXDI the amount of TMFIC was changed to 140 g and the amount of DBP was changed to 6.0 g [2.5% by weight based on the total of TDI+TMPIC)], to obtain a polyurethane lens which was excellent similarly to the lens of Example 5, as shown in Table 1.

EXAMPLE 7

The procedure of Example 5 was repeated except that 50 g of TDI and 50 g of mXDI were used in place of 100 g of mXDI, the amount of TMPIC was changed to 135 g and the amount of DBP was changed to 5.9 g [2.5% by weight based on the total of (TDI+mXDI+TMPIC)], to obtain a polyurethane lens which was excellent similarly to the lens of Example 5, as shown in Table 1.

EXAMPLE 8

The procedure of Example 5 was repeated except that 97 g of pentaerythritol tetrakis(3-mercaptopropionate) (PETMP) and 31 g of TMPIC were used in place of 124 g of TMPIC and the amount of DBP was changed to 5.7 g [2.5% by weight based on the total of (mXDI+TMPIC+PETMP)]to obtain a polyurethane lens which was excellent similarly to the lens of Example 5, as shown in Table 1.

EXAMPLE 9

The procedure of Example 5 was repeated except that 65 g of PETMP and 62 g of TMPIC were used in place of 124 g of TMPIC and the amount of DBP was changed to 5.7 g [2.5% by weight based on the total of (mXDI+TMPIC+PETMP)], to obtain a polyurethane lens which was excellent similarly to the lens of Example 5, as shown in Table 1.

EXAMPLE 10

The procedure of Example 5 was repeated except that 32 g of PETMP and 93 g of TMPIC were used in place of 124 g of TMPIC, to obtain a polyurethane lens which was excellent similarly to the lens cf Example 5, as shown in Table 1.

EXAMPLE 11

The procedure of Example 5 was repeated except that 75 g of TDI and Z5 g of mXDI were used in place of 100 g of mXDI and the amount of TMPIC was changed to 126 g, to obtain a polyurethane lens which was excellent similarly to the lens of Example 5, as shown in Table 1.

EXAMPLE 12

The procedure of Example 5 was repeated except that 25 g of TDI and 75 g of mXDI were used in place of 100 g of mXDI, the amount of TMPIC was changed to 132 g and the amount of DBP was changed to 5.8 g [2.5% by weight based on the total of (mXDI+TDI+TMPIC)], to obtain a polyurethane lens which was excellent similarly to the lens of Example 5, as shown in Table 1.

EXAMPLE 13

The procedure of Example 5 was repeated except that the amount of DBP was changed to 1.8 g [0.8% by weight based on the total of (mXDI+TMPIC)], to obtain a polyurethane lens which was excellent similarly to the lens of Example 5, as shown in Table 1.

EXAMPLE 14

The procedure of Example 5 was repeated except that 100 g of TDI was used in place of 100 g of mXDI, the amount of TMPIC was changed to 140 g and the amount of DBP was changed to 1.9 g [0.8% by weight based on the total of (TDI+TMPIC)]. to obtain a polyurethane lens which was excellent similarly to the lens of Example 5as shown in Table 1.

EXAMPLE 15

The procedure of Example 5 was repeated except that 100 g of TDI was used in Place of 100 g of mXDI, the amount of TMPIC was changed to 140 g and the amount of DBP was changed to 3.6 g [1.5% by weight based on the total of (TDI+TMPIC)], to obtain a polyurethane lens which was excellent similarly to the lens of Example 5, as shown in Table 1.

COMPARATIVE EXAMPLE 1-2

The procedure of Example 1 was repeated except that there was used a phosphoric acid ester not included in those of the general formula (I) of the present invention, i.e. tributyl phosphate (TBP) in Comparative Example 1 and monobutyl phosphate (MBP) in Comparative Example 2, to obtain a polyurethane lens. As shown in Table 1, the releasability of the lens from the mold was "fail" (X) in Comparative Example 1; and in Comparative Example 2, the lens ha cloudiness and contained precipitates of opaque substances.

COMPARATIVE EXAMPLE 3

The procedure of Example 1 was repeated except that there was used, as a phosphoric acid ester, a mixture (AP-10, product of Daihachi Chemical) of isodecyl phosphate and diisodecyl phosphate, both of which are not included in the phosphoric acid esters of the general formula (I) of the present invention and each of whose alkyl groups has 10 carbon atoms, to obtain a polyurethane lens. As shown in Table 1, the lens had inferior transparency and was cloudy.

COMPARATIVE EXAMPLE 4

The procedure of Example 1 was repeated except that dibutyl phosphite (DBP-1, product of Daihachi Chemical) was used in place of the phosphoric acid ester of the present invention, to obtain a polyurethane lens. As shown in Table 1, the releasability of the lens from the mold was "fail" (X).

COMPARATIVE EXAMPLES 5-6

The procedure of Example 1 was repeated except that there was used, as a releasing agent, a conventional silicon-based releasing agent (L-722, product of Shin-Etsu Silicon), to obtain a polyurethane lens. In Comparative Example 5 which used a small amount of the silicon-based releasing agent, the releasability of the lens from the mold was "fail" (X). In Comparative Example 6 which used a large amount of the silicon-based releasing agent, the lens releasability was "pass" (O) but the lens was cloudy and had inferior transparency.

COMPARATIVE EXAMPLE 7-8

The procedure of Example 1 was repeated except that no DBP was used and instead a conventional releasing agent (YSR-6209, a silicon-based releasing agent manufactured by Toshiba Silicon in Comparative Example 7 and MS-443, a fluorine-based releasing agent manufactured by Daikin in Comparative Example 8) was coated on the glass-made mold. That is, a toluene solution containing 5% of YSR-6209 or a fron solution containing 5% of MS-443 was prepared; the glass-made mold was dipped in this solution and then heated at 250° C. for 30 minutes; the resulting mold was used in cast polymerization.

As shown in Table 1, in Comparative Example 7 using YSR-6209, the lens releasability was good; however, the color unevenness after tinting was striking and "fail" (X), the removal of the releasing agent remaining on the glass made mold was difficult, and there was a problem in productivity. In Comparative Example 8 using MS-443, there appeared the separation of the produced polymer from the mold inner surface during polymerization and the resulting product was unsuitable as a lens, the color uneVenness after tinting was "fail" (X), and as in the case of Comparative Example 7 using YSR-6209, the removal of the releasing agent remaining on the glass-made mold was difficult.

TABLE 1

| | Monomers | | | | | Releasing agent | | Releasability | Color unevenness | Transparency | $N_D/\gamma_D$ |
|---|---|---|---|---|---|---|---|---|---|---|---|
| Example 1 | mXDI | 100 g | PETMP | 142 g | DBP | 6.05 g | | O | O | O | 1.592/36 |
| Example 2 | mXDI | 100 g | PETMP | 142 g | DBP | 2.8 g | | O | O | O | 1.593/36 |
| Example 3 | IPDI | 115 g | PETMP | 142 g | DBP | 2.8 g | | O | O | O | 1.570/40 |
| Example 4 | mXDI TDI | 95 g 5 g | PETMP | 132 g | DBP | 1.4 g | | O | O | O | 1.595/35 |
| Example 5 | mXDI | 100 g | TMPIC | 124 g | DBP | 5.6 g | | O | O | O | 1.61/35 |
| Example 6 | TDI | 100 g | TMPIC | 140 g | DBP | 6.0 g | | O | O | O | 1.63/29 |
| Example 7 | mXDI TDI | 50 g 50 g | TMPIC | 135 g | DBP | 5.9 g | | O | O | O | 1.62/32 |
| Example 8 | mXDI | 100 g | TMPIC PETMP | 31 g 97 g | DBP | 5.7 g | | O | O | O | 1.60/36 |
| Example 9 | mXDI | 100 g | TMPIC PETMP | 62 g 65 g | DBP | 5.7 g | | O | O | O | 1.60/36 |
| Example 10 | mXDI | 100 g | TMPIC PETMP | 93 g 32 g | DBP | 5.6 g | | O | O | O | 1.60/35 |
| Example 11 | mXDI TDI | 25 g 75 g | TMPIC | 126 g | DBP | 5.6 g | | O | O | O | 1.62/33 |
| Example 12 | mXDI TDI | 75 g 25 g | TMPIC | 132 g | DBP | 5.8 g | | O | O | O | 1.62/30 |
| Example 13 | mXDI | 100 g | TMPIC | 124 g | DBP | 1.8 g | | O | O | O | 1.61/35 |
| Example 14 | TDI | 100 g | TMPIC | 140 g | DBP | 1.9 g | | O | O | O | 1.63/29 |
| Example 15 | TDI | 100 g | TMPIC | 140 g | DBP | 3.6 g | | O | O | O | 1.63/29 |
| Comparative Example 1 | mXDI | 100 g | PETMP | 142 g | TBP | 2.4 g | | X | — | — | — |
| Comparative Example 2 | mXDI | 100 g | PETMP | 142 g | MBP | 2.4 g | | O | — | X | — |
| Comparative Example 3 | mXDI | 100 g | PETMP | 142 g | AP-10 | 2.4 g | | O | — | X | — |
| Comparative Example 4 | mXDI | 100 g | PETMP | 142 g | DBP-1 | 2.4 g | | X | — | — | — |
| Comparative Example 5 | mXDI | 100 g | PETMP | 142 g | L-722 | 0.01 g | | X | — | — | — |
| Comparative Example 6 | mXDI | 100 g | PETMP | 142 g | L-722 | 2.0 g | | O | — | X | — |
| Comparative Example 7 | mXDI | 100 g | PETMP | 142 g | YSR-6209 | | | O | X | O | — |
| Comparative Example 8 | mXDI | 100 g | PETMP | 142 g | MS-443 | | | O | X | O | — |

EXPLANATION ON TABLE 1

1. Symbols mXDI: m-Xylene diisocyanate
IPDI: Isophorone diisocyanate
TDI: Tolylene diisocyanate
PETMP: Pentaerythritol tetrakis(3-mercaptopropionate)
TMPIC: Tris(3-mercapto-n-propyl) isocyanurate
DBP: Dibutyl phosphate
TBP: Tributyl phosphate
MBP: Monobutyl phosphate
AP-10: Mixture of isodecyl phosphate and diisodecyl phosphate, manufactured by Daihachi Chemical
DBP-1: Dibutyl phosphite manufactured by Daihachi Chemical
L-722: Silicon-based releasing agent manufactured by Shin-Etsu Silicon
YSR-6209: Silicon-based releasing agent manufactured by Toshiba Silicon
MS-443: Fluorine-based releasing agent manufactured by Daikin

2. Measurement methods

(1) Releasability

When a produced lens could be released from the glass-made mold with no damage of the lens and the mold, the releasability was reported as "pass" (O). For all other cases, the releasability was reported as "fail" (X).

(2) Color unevenness after tinting

A lens after tinting was visually inspected. When there was no color unevenness, the color unevenness of the lens was reported as "pass" (O); and when there was color unevenness, the color unevenness of the lens was reported as "fail" (X).

(3) Transparency

A lens released from the glass-made mold was visually inspected in a dark place under a fluorescent light. When the lens had no cloudiness and contained no opaque precipitates, the transparency was reported as "pass" (O); and when the lens had cloudiness and contained opaque precipitates, the transparency was reported as "fail" (X).

(4) $N_D$ and $\nu_D$

Measured using an Abbe refractometer.

In Table 1, there are places where no data are given for color unevenness, transparency, impact resistance and $N_D/\nu_D$. No data implies "unable to measure" or "measurement was not made".

Next, Examples 16–33 with respect to the present process for polyurethane lens production further including the step (c) for cured film formation or the step (c) and the step (d) for anti-reflection film formation are described and compared with Comparative Examples 9–12.

EXAMPLE 16

[Organic tin compound was used as component (D)]

(i) Production of polyurethane lens by polymerization

There were mixed, by sufficient stirring, 100 parts by weight of m-xylene diisocyanate, 142 parts by weight of pentaerythritol tetrakis(3-mercaptopropionate), 6 parts by weight of di-n-butyl phosphate, 0.25 part by Weight of dibutyltin dilaurate and 0.5 part by weight of 2-(2'hydroxy-5'-t-octylphenyl)benzotriazole as an ultraviolet absorber. The mixture was then degased at a vacuum of 1 mmHg for 60 minutes.

The mixture was poured into a mold consisting of a glass-made mold for lens production and a resin-made gasket, and subjected to polymerization by continuously heating from 25° C. to 120° C. in 20 hours and then maintaining at 120° C. for 2 hours. After the polymerization, the gasket was removed and the produced lens was released from the mold to obtain a polyurethane lens.

The lens had an $N_D$ of 1.592 and a $\nu_D$ of 36 and accordingly good optical properties. This lens had about the same physical and chemical properties as the lens obtained in Example 1.

(ii) Preparation of coating composition 54 parts by weight of a 0.06 N aqueous hydrochloric acid solution was dropwise added to 212 parts by weight of γ-glycidoxypropyltrimethoxysilane with stirring. After the dropwise addition, stirring was effected for 24 hours to obtain a hydrolyzate. Then, there were added 424 parts by weight of an antimony pentoxide sol (methanol dispersion, average particle diameter=10 nm, solid content=30%) and 34 parts by weight of an epoxy compound (DENACOL EX-521, a polyglycerol polyglycidyl ether manufactured by Nagase Chemical), and the mixture was stirred for 5 hours. 6.8 parts by weight of dibutyltin dilaurate was added and the whole mixture was aged for 100 hours to obtain a coating composition.

(iii) Production of polyurethane lens with cured film

The polyurethane lens produced in the above (i) was immersed in a 10% aqueous NaOH solution of 50° C. for 5 minutes to thoroughly wash the lens. Then, according to a dipping method (pulling-up speed=12 cm/min the lens was coated with the coating composition prepared in the above (ii) and heated at 120° C. for 1 hour to form a cured film on the lens.

The thus obtained lens with a cured film was evaluated for mar resistance, interference fringes, adhesion, appearance and impact resistance. The results are shown in Table 3. As is clear from Table 3, the lens marked A' for mar resistance, A' for interference fringes and showed good adhesion, appearance and impact resistance. Thus, the lens was excellent overall.

(iv) Production of polyurethane lens with cured film and anti-reflection film

The procedures (i), (ii) and (iii) were repeated to obtain another polyurethane lens with a cured film. Then, an anti-reflection film was formed on the cured film according to vacuum deposition. That is, vacuum deposition was effected in the order of $SiO_2\ 3\lambda/2$, $ZrO_2\ \lambda/6$, $SiO_2\ \lambda/10$, $ZrO_2\ \lambda/2$ and $SiO_2\ \lambda/4$ at a vacuum of $3\times10^{-5}$ mmHg at a substrate temperature of 85° C. to obtain an anti-reflection type polyurethane lens having a both faces reflection rate of 2%.

The evaluation results of the above polyurethane lens with a cured film and an anti-reflection film are shown in Table 3. As is clear from Table 3, the lens marked A' for mar resistance and interference fringes and showed good adhesion, appearance and impact resistance. Thus, the lens was excellent overall.

EXAMPLES 17–23

The procedure of Example 16 was repeated except that a coating composition shown in Table 2 was used, to obtain 7 different polyurethane lenses each with a cured film and 7 different polyurethane lenses each with a cured film and an anti-reflection film. These lenses were evaluated in the same manner as in Example 16. The evaluation results are shown in Table 3 The lenses showed the results at least equivalent to those of the lenses of Example 16.

COMPARATIVE EXAMPLES 9–10

The procedure of Example 16 was repeated except that a coating composition shown in Table 2 was used, to obtain 2 different polyurethane lenses each with a cured film and 2 different polyurethane lenses each with a cured film and an anti-reflection film. These lenses were evaluated in the same manner as in Example 16. The evaluation results are shown in Table 5. As is clear from Table 5, the lenses of Comparative Example 9 using no epoxy compound [no component (C)]were inferior in adhesion and the lenses of Comparative Example 10 containing no organic tin compound [no component (D)] were inferior in mar resistance and interference fringes.

B': Intermediate between B and C (2) Interference fringes

TABLE 2

| | Coating composition (weight ratio) | | | | Component (B)/component (A) |
|---|---|---|---|---|---|
| | Component (A) | Component (B)* | Component (C) | Component (D) | |
| Example 16 | 62.5 | 37.5 | 30 | 2 | 0.6 |
| Example 17 | 50 | 50 | 30 | 2 | 1 |
| Example 18 | 40 | 60 | 30 | 2 | 1.5 |
| Example 19 | 33.3 | 66.7 | 30 | 2 | 2 |
| Example 20 | 28.6 | 71.4 | 30 | 2 | 2.5 |
| Example 21 | 50 | 50 | 30 | 4 | 1 |
| Example 22 | 50 | 50 | 30 | 0.5 | 1 |
| Example 23 | 50 | 50 | 50 | 2 | 1 |

*In terms of solid content

TABLE 3

| | Evaluation results | | | | | | | | | |
|---|---|---|---|---|---|---|---|---|---|---|
| | Mar resistance | | Interference fringes | | Adhesion | | Appearance | | Impact resistance | |
| | (a) | (b) | (a) | (b) | (a) | (b) | (a) | (b) | (a) | (b) |
| Example 16 | A' | A' | A' | A' | Good | Good | Good | Good | Good | Good |
| Example 17 | A' | A' | A' | A' | Good | Good | Good | Good | Good | Good |
| Example 18 | A | A | A' | A' | Good | Good | Good | Good | Good | Good |
| Example 19 | A | A | A | A | Good | Good | Good | Good | Good | Good |
| Example 20 | A | A | A | A | Good | Good | Good | Good | Good | Good |
| Example 21 | A | A | A' | A' | Good | Good | Good | Good | Good | Good |
| Example 22 | A' | A' | A' | A' | Good | Good | Good | Good | Good | Good |
| Example 23 | A' | A' | A' | A' | Good | Good | Good | Good | Good | Good |

Note:
In the above table, (a) shows the result of polyurethane lens with a cured film, and (b) shows the result of a polyurethane lens with a cured film and an anti-relection film.

TABLE 4

| | Coating composition (weight ratio) | | | | Component (B)/component (A) |
|---|---|---|---|---|---|
| | Component (A) | Component (B)* | Component (C) | Component (D) | |
| Comparative Example 9 | 50 | 50 | 0 | 2 | 1 |
| Comparative Example 10 | 50 | 50 | 30 | 0 | 1 |

*In terms of solid content

TABLE 5

| | Evaluation results | | | | | | | | | |
|---|---|---|---|---|---|---|---|---|---|---|
| | Mar resistance | | interference fringes | | Adhesion | | Appearance | | Impact resistance | |
| | (a) | (b) | (a) | (b) | (a) | (b) | (a) | (b) | (a) | (b) |
| Comparative Example 9 | A' | A' | A' | A' | Peeled | Peeled | Good | Good | Good | Good |
| Comparative Example 10 | C | C | B | B | Good | Good | Good | Good | Good | Good |

Note:
In the above table, (a) shows the result of a polyurethane lens with a cured film, and (b) shows the result of a polyurethane lens with a cured film and an anti-reflection film.

In Tables 3 and 5 as well as Tables 7 and 9 (to appear later), the mar resistance, interference fringes, adhesion, appearance and impact resiStance were evaluated according to the following methods.

(1) Mar resistance

The surface of a lens was rubbed with a #0000 steel wool and the surface condition was inspected visually. The criterion of evaluation was as follows.

A: Almost no mar when rubbed strongly

B: A considerable amount of mar when rubbed strongly

C: Mar equivalent to that formed on the surface of the lens substrate

A': Intermediate between A and B

Inspected visually under a fluorescent light. The criterion of evaluation was as follows.

A: Almost no interference fringes are seen.

B: Slight interference fringes are seen.

C: Interference fringes are seen considerably.

A': Intermediate between A and B

B': Intermediate between B and C (3) Adhesion

On the surface of a lens was formed, by cross-cutting, 100 squares each of 1 mm×1 mm. Then, a cellophane adhesive tape was strongly adhered onto the surface and peeled rapidly. The occurrence or nonoccurrence of peeling of the cured film or of the cured film and the anti-reflection film was inspected.

(4) Appearance

A lens was visually examined for film transparency and surface smoothness.

(5) Impact resistance

A steel ball weighing 16 g was dropped on the center of a lens having a center thickness of 2 mm from a height of 127 cm. The extent of damage was examined.

EXAMPLE 24

[Organic titanium compound was used as component (D)]

(i) Production of polyurethane lens by polymerization

The procedure of Example 16 (i) was repeated to obtain a polyurethane lens.

(ii) Preparation of coating composition 54 parts by weight of a 0.06 N aqueous hydrochloric acid solution was dropwise added to 212 parts by weight of γ-glycidoxypropyltrimethoxysilane with stirring. After the dropwise addition, stirring was effected for 24 hours to obtain a hydrolyzate. Then, there were added 424 parts by weight of an antimony pentoxide sol (methanol dispersion, average particle diameter=10 nm, solid content=30%), 68 parts by weight of an epoxy compound (DENACOL EX-521, a polyglycerol polyglycidyl ether manufactured by Nagase Chemical) and 34 parts by weight of titanium isopropoxyoctylene glycolate. The whole mixture was aged for 100 hours with stirring to obtain a coating composition.

(iii) Production of polyurethane lens with cured film

The procedure of Example 16 (iii was repeated to obtain a polyurethane lens with a cured film.

The thus obtained lens with a cured film was evaluated for mar resistance, interference fringes, adhesion, appearance and impact resistance. The results are shown in Table 7. As is clear from Table 7, the lens marked A' for mar resistance, A' for interference fringes and showed good adhesion, appearance and impact resistance. Thus, the lens was excellent overall.

(iv) Production of polyurethane lens with cured film and anti-reflection film

The procedures (i), (ii) and (iii) were repeated to obtain another polyurethane lens with a cured film. Then, an anti-reflection film was formed on the cured film according to the same method as described in Example 16 (iv).

The evaluation results of the above-obtained polyurethane lens with a cured film and an anti-reflection film are shown in Table 7. As is clear from Table 7, the lens marked A' for mar resistance and interference fringes and showed good adhesion, appearance and impact resistance. Thus, the lens was excellent overall.

EXAMPLES 25–33

The procedure of Example 24 was repeated except that a coating composition shown in Table 6 was used, to obtain 9 different polyurethane lenses each with a cured film and 9 different polyurethane lenses each with a cured film and an anti-reflection film. These lenses were evaluated in the same manner as in Example 24 The evaluation results are shown in Table 7. As is clear from Table 7, the results were at least equivalent to those of the lenses of Example 24.

COMPARATIVE EXAMPLES 11–12

The procedure of Example 24 was repeated except that a coating composition shown in Table 8 was used, to obtain 2 different polyurethane lenses each with a cured film and 2 different polyurethane lenses each with a cured film and an anti-reflection film. These lenses were evaluated in the same manner as in Example 24. As is clear from the evaluation results shown in Table 9, the lenses of Comparative Example 11 using no titanium isopropoxyoctylene glycolate [no component (D)] were interior in adhesion, and the lenses of Comparative Example 12 using no epoxy compound [no component (C)]were also inferior in adhesion.

TABLE 6

| | Coating composition (weight ratio) | | | | |
|---|---|---|---|---|---|
| | Component (A) | Component (B)* | Component (C) | Component (D) | Component (B)/component (A) |
| Example 24 | 62.5 | 37.5 | 20 | 10 | 0.6 |
| Example 25 | 50 | 50 | 20 | 10 | 1 |
| Example 26 | 40 | 60 | 20 | 10 | 1.5 |
| Example 27 | 33.3 | 66.7 | 20 | 10 | 2 |
| Example 28 | 28.6 | 71.4 | 20 | 10 | 2.5 |
| Example 29 | 25 | 75 | 20 | 10 | 3 |
| Example 30 | 33.3 | 66.7 | 10 | 20 | 2 |
| Example 31 | 33.3 | 66.7 | 15 | 40 | 2 |
| Example 32 | 25 | 75 | 10 | 20 | 3 |
| Example 33 | 25 | 75 | 15 | 20 | 3 |

*In terms of solid content

TABLE 7

| | Evaluation results | | | | | | | | | |
|---|---|---|---|---|---|---|---|---|---|---|
| | Mar resistance | | Interference fringes | | Adhesion | | Appearance | | Impact resistance | |
| | (a) | (b) | (a) | (b) | (a) | (b) | (a) | (b) | (a) | (b) |
| Example 24 | A' | A' | A' | A' | Good | Good | Good | Good | Good | Good |
| Example 25 | A' | A' | A' | A' | Good | Good | Good | Good | Good | Good |
| Example 26 | A | A | A' | A' | Good | Good | Good | Good | Good | Good |
| Example 27 | A | A | A' | A' | Good | Good | Good | Good | Good | Good |
| Example 28 | A | A | A | A | Good | Good | Good | Good | Good | Good |
| Example 29 | A | A | A | A | Good | Good | Good | Good | Good | Good |
| Example 30 | A | A | A | A | Good | Good | Good | Good | Good | Good |
| Example 31 | A | A | A | A | Good | Good | Good | Good | Good | Good |

TABLE 7-continued

| | Evaluation results | | | | | | | | | |
|---|---|---|---|---|---|---|---|---|---|---|
| | Mar resistance | | Interference fringes | | Adhesion | | Appearance | | Impact resistance | |
| | (a) | (b) | (a) | (b) | (a) | (b) | (a) | (b) | (a) | (b) |
| Example 32 | A | A | A | A | Good | Good | Good | Good | Good | Good |
| Example 33 | A | A | A | A | Good | Good | Good | Good | Good | Good |

Note:
In the above table, (a) shows the result of a polyurethane lens with a cured film, and (b) shows the result of a polyurethane lens with a cured film and an anti-reflection film.

TABLE 8

| | Coating composition (weight ratio) | | | | |
|---|---|---|---|---|---|
| | Component (A) | Component (B)* | Component (C) | Component (D) | Component (B)/component (A) |
| Comparative Example 11 | 33.3 | 66.7 | 20 | 0 | 2 |
| Comparative Example 12 | 33.3 | 66.7 | 0 | 10 | 2 |

*In terms of solid content

TABLE 9

| | Evaluation results | | | | | | | | | |
|---|---|---|---|---|---|---|---|---|---|---|
| | Mar resistance | | Interference fringes | | Adhesion | | Appearance | | Impact resistance | |
| | (a) | (b) | (a) | (b) | (a) | (b) | (a) | (b) | (a) | (b) |
| Comparative Example 11 | A | A | A | A | Peeled | Peeled | Good | Good | Good | Good |
| Comparative Example 12 | A | A | A | A | Peeled | Peeled | Good | Good | Good | Good |

Note:
In the above table, (a) shows the result of a polyurethane lens with a cured film, and (b) shows the result of a polyurethane lens with a cured film and an arti-reflection film.

As is appreciated from the foregoing, the present process can produce a polyurethane lens which has good releasability from mold, is free from color unevenness after tinting, film peeling and cloudiness and has good impact resistance, a high $N_D$ and a high $\nu_D$.

The present process can further produce a polyurethane lens having such a cured film that has sufficient hardness to improve the inherently low mar resistance of polyurethane lens, has excellent transparency and excellent adhesion to polyurethane lens base and, owing to the small difference in refractive index between the cured film and the polyurethane lens base, causes no interference fringes.

The present process can furthermore produce a polyurethane lens with a cured film and an anti-reflection film.

The above-described embodiments are just examples of the present invention, and therefore, it will be apparent for those skilled in the art that many modifications and variations may be made without departing from the scope of the present invention.

What is claimed is:

1. A process for producing a polyurethane lens, which comprises:
   (a) a step of adding to a monomer mixture comprising a polyisocyanate and a polythiol, a phosphoric acid ester represented by the general formula (I)

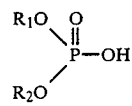

(I)

($R_1$ and $R_2$ which may be the same or different are each an alkyl group of 1-8 carbon atoms), and
   (b) a step of subjecting the monomer mixture containing the phosphoric acid ester, obtained in the step (a) to cast polymerization in a mold for plastic lens production to obtain a desired polyurethane lens.

2. A process according to claim 1, which further includes:
   (c) a step of coating on the surface of the polyurethane lens obtained in the step (b), a coating composition comprising the following components (A, (B), (C) and (D) and then curing the composition to form a cured film,
   (A) An organosilicon compound represented by the general formula $R^1Si(OR^2)_3$ ($R^1$ is an epoxy group-continuing organic group of 4-14 carbon atoms and $R^2$ is a $C_{1-4}$ alkyl or $C_{1-4}$ alkyl carbonyl group) or a hydrolyzate thereof,
   (B) A sol of antimony pentoxide having particle diameters of 5-50 nm colloidally dispersed in an organic solvent,
   (C) At least one epoxy compound represented by the following general formula;

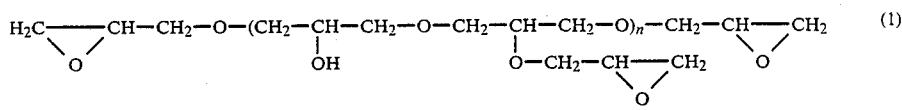

(1)

(n is 2 or 3.)

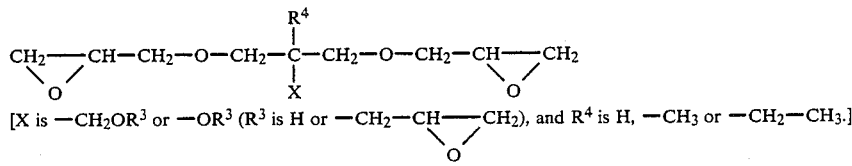

(2)

[X is —CH₂OR³ or —OR³ (R³ is H or —CH₂—CH—CH₂), and R⁴ is H, —CH₃ or —CH₂—CH₃.]

(D) At least one member selected from the group consisting of dibutyltin dilaurate, dibutyltin maleate and titanium isopropoxyoctylene glycolate.

3. A process according to claim 2, which further includes:
(d) a step of forming on the cured film formed in the step (c), an anti-reflection film comprising inorganic substances.

4. A polyurethane lens produced according to the process of claim 1.

5. A polyurethane lens with a cured film produced according to the process of claim 2.

6. A polyurethane lens with a cured film and an anti-reflection film produced according to the process of claim 3.

Adverse Decisions In Interference

Patent No. 4,975,328, Yoshiro Hirose, Takeshi Sakamoto, Masahisa Kosaka, Mitsuo Sugimura, Kazuo Inoue, Eiichi Yajima, Kunio Sasaki, PROCESS FOR PRODUCING POLYURETHANE LENS, Interference No. 103,438, final judgment adverse to the patentees rendered March 21, 1997, as to claims 1 and 4.

*(Official Gazette October 27, 1998)*